2,964,956
ACCELERATION-CONTROL DEVICE

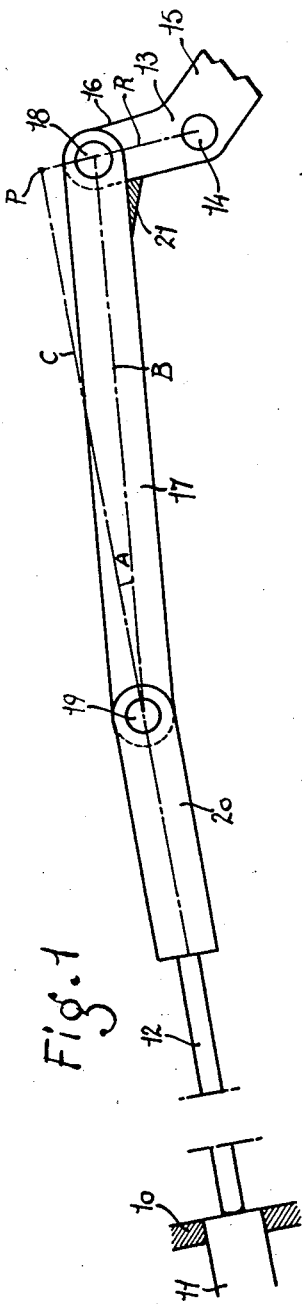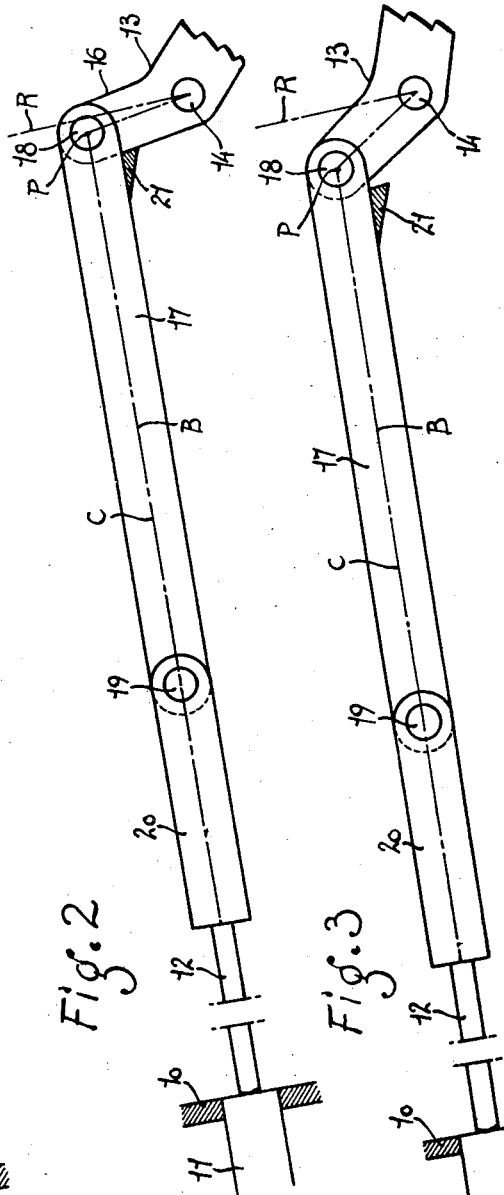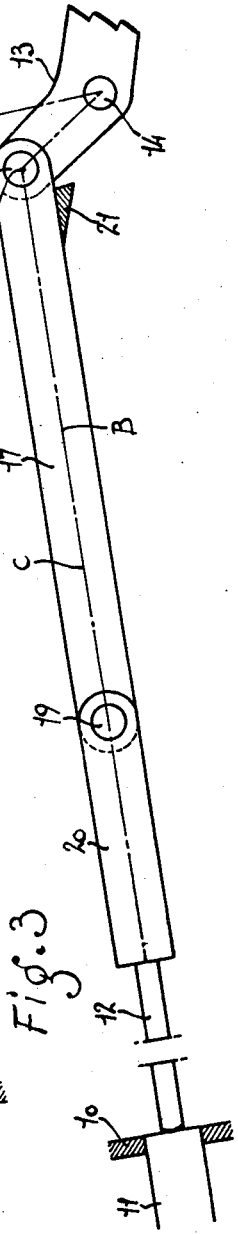

Jean Maurice and Michel Rist, Paris, France, assignors to Societe Anonyme Francaise du Ferodo, Paris, France, a corporation of France Filed Dec. 17, 1957, Ser. No. 703,334

Claims priority, application France Dec. 21, 1956

2 Claims. (Cl. 74—105)

The present invention relates to an acceleration control device, especially for automobile vehicles, in which the gearing-down of the control between the pedal and the throttle valve is accentuated when the pedal is slightly depressed so as to facilitate delicate manoeuvres with a small throttle opening. By the general term "throttle" adopted for convenience in the present description, is to be understood any means of regulation of the speed of a heat engine, in particular an explosion engine or a diesel engine.

The present invention has for its object an acceleration control device, especially for automobile vehicles, characterised in that a pull motion from the pedal is applied to a pivoted lever which controls the throttle by the intermediary of a link which is pivoted both at the point of application of this force and on the said lever, a lower limit being fixed for the angle between the link and the lever. The control is thus effected in two phases, one with a decreasing mechanical advantage in which the link becomes progressively aligned with the tractive effort from the pedal, the crank-arm being buttressed on the lever, the other with a substantially constant mechanical advantage in which the link is no longer buttressed and becomes aligned with the tractive force. The transition between the two phases is continuous, the geared-down effect decreasing during the first phase to the value which it will retain substantially during the whole of the second phase, so that the user does not feel any abrupt variation in hardness of the pedal action. In addition to this advantage, the construction in accordance with the invention is both simple and convenient.

In a preferred form of construction which is applicable to controls in which the pedal acts on the lever by a cable, instead of this cable being attached directly to the lever, it is coupled thereto through the intermediatry of a link pivoted at its two extremities, while an abutment is provided between the crank-arm and the lever.

The particular features and advantages of the invention will further become apparent from the description which follows below of one form of construction, chosen by way of example, reference being made to the accompanying drawings, in which:

Fig. 1 is a diagrammatic view of a device in accordance with the invention shown in the closed position of the throttle.

Fig. 2 is a view similar to that of Fig. 1, but shown in a position of transition between the first phase and the second phase.

Fig. 3 is a further view similar to that of Fig. 1, but in a position which forms part of this second phase.

Figure 4:
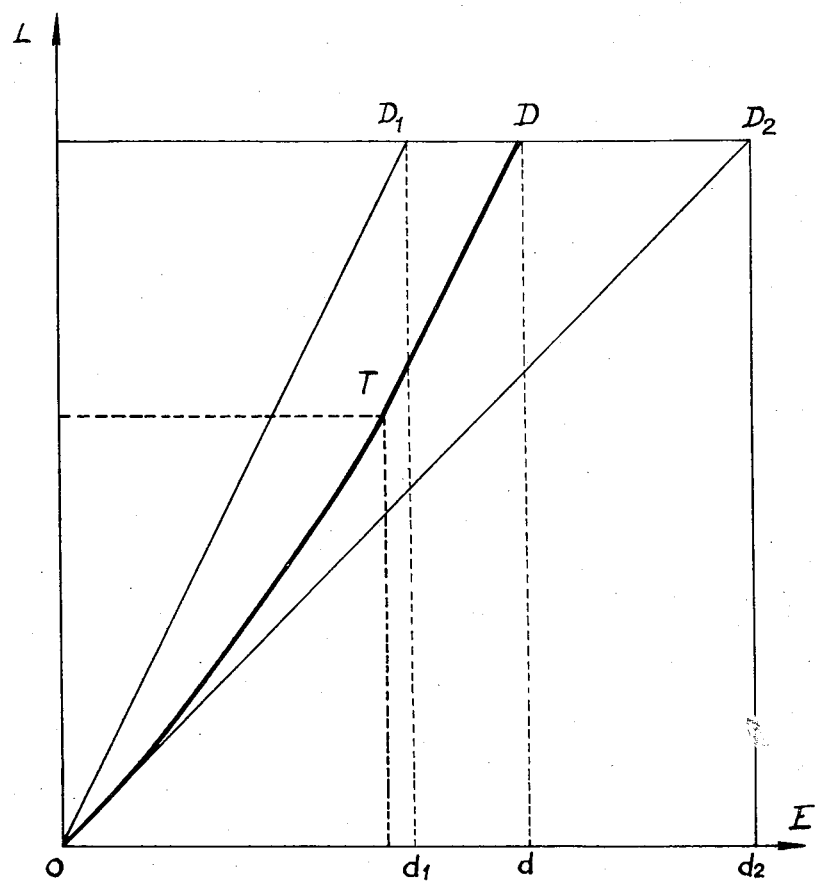
Fig. 4 is a diagram illustrating the variations of the throttle opening as a function of the angular depression of the accelerator pedal.

Reference will first be made to Fig. 1, in which there is seen at 10 a fixed support to which is secured the sheath 11 of a cable 12. This cable is operated by the accelerator pedal (not shown) and is drawn towards the left of Fig. 1 when this pedal is depressed. There is also seen in Fig. 1 at 13 a cranked return lever which is pivoted about a fixed shaft 14, and the arm 15 of which actuates the opening of the butterfly valve of the carburettor. The lever 13 turns through a small angle between the extreme positions of opening and closure of the throttle. The other arm 16 of the lever 13 remains substantially perpendicular to the line of action C of the cable 12. Elastic restoring means are provided for bringing the throttle into the position of closure, in which the arm 16 of the lever 13 occupies the extreme right-hand position of rest of Fig. 1.

In accordance with the invention, a link or crank-arm 17 is articulated at 18 on the extremity of the arm 16 of the lever 13 and at 19 to a fork 20 which is coupled to the end of the cable 12. The cable 12 is preferably given a great length between the pivot 19 and the support 10. The crank-arm 17 carries an abutment 21 which co-operates with the arm 16 in such manner as to prevent the angle 19—18—14 from becoming less than a pre-determined value. In the example shown, this value is chosen to be slightly greater than a right-angle, for example equal to about 100 degrees (see Figs. 1 and 2). However, the abutment 21 enables this angle to open beyond this value (see Fig. 3). In an alternative embodiment, the abutment 21 could be carried on the arm 16 and would co-operate with the crank-arm 17.

In the position of rest, throttle closed, of Fig. 1, in which the arm 16 occupies an extreme right-hand position, the abutment 21 of the crank-arm 17 bears against the arm 16 and the link 17 has its line of action 19—18 shown at B, which forms a small angle A with the line C, for example of about 10 degrees, the crank-arm 17 being thus almost in alignment with the cable 12 but displaced by the angle A towards the pivot 14. There is shown at P the point of intersection of the line C with the line 14—18 of the arm 16 in the position of rest R.

When the accelerator pedal begins to be depressed, thus pulling the cable 12 and the pivot 19 towards the left, the link 17 tends to take-up a direction in line with the line C, but can only follow this tendency by bodily rotation with arm 16 around pivot 14, since the abutment 21 prevents any reduction of the angle 19—18—14. During the course of this first phase, the assembly 17—16 thus forms a unit which moves towards the left, rotating about the pivot 14, whilst the angle A becomes less by the rotation of the pivotal joint 19.

At the beginning of this first phase, the arm by which the tractive pull of the cable 12 causes the lever 13 to rotate about the pivot 14 is substantially 14—P, that is to say its mechanical advantage is greater than 14—18, and this accentuates the gearing-down effect. At the origin, the ratio of the mechanical advantages 14—P and 14—18 is preferably chosen between 1.5 and 3. During the depression of the pedal in the course of the first phase, the angle A becomes smaller, the point P comes closer to the point 18, and the gearing-down becomes progressively smaller.

The line of action C of the cable has been shown in Figs. 1 and 2 as having the same direction, since the pivot 19 has been made very distant from the support 10. In the contrary case, which is not excluded from the scope of the invention, the cable 12 would have a slight deflection at 10.

When the link 17 (see Fig. 2) has come into alignment with the line C, the point P having moved to 18, it has no further tendency to reduce the angle 19—18—14, and the abutment 21 no longer forms an effective support against the arm 16. The assembly 12—20—17 acts like a direct coupling and applies a pull to the articulation 18, causing the arm 16 to turn about the pivot 14, whilst the abutment 21 moves further away from the arm 16. The system has now entered its second phase (see Fig. 3) in which the gearing-down remains substantially constant, according to the arm or mechanical advantage 14—18.

It is to be noted that the transition between the first phase and the second phase, illustrated in Fig. 2, is smooth and continuous since there is no abrupt change in the gearing-down effect during the entire travel of the accelerator pedal. This effect first gradually reduces to a pre-determined value and then substantially retains this same value. The user therefore feels practically no abrupt variation in hardness of the pedal.

These results are illustrated by the diagram of Fig. 4, in which the depression of the accelerator pedal is plotted as abscissae OE, and the angle of rotation of the lever 13 about the pivot 14 as ordinates OL.

The line $OD_1$ is substantially a straight line and shows how L would vary as a function of E if the cable 12 were directly attached at 18; the line $OD_2$ also substantially a straight line, would represent this function if the cable 12 were connected to an arm 16 which had a certain constant maximum length 14—P, and the line OD represents the variations of L as a function of E, in accordance with the invention.

It can be seen that the abscissa O$d$ is much closer to the abscissa O$d_1$ than is the abscissa O$d_2$, so that the total travel of the pedal in accordance with the invention is practically not increased as compared with that which would be obtained if the cable 12 were directly attached at 18.

It can also be seen that the curve OD has no discontinuity and that it is made-up of a concave section OT which corresponds to the first phase and which is tangential to the line $OD_2$, and of a substantially rectilinear section TD which corresponds to the second phase and which has the same slope as the line $OD_1$. Whilst taking advantage of an accentuated gearing-down effect at small throttle openings, which assists him in making delicate manoeuvres, the user thus has available the normal conditions of control at medium and large throttle openings. At the point of transition T which corresponds to Fig. 2, the section OT is tangential to the section TD, which ensures a smooth continuity during operation.

It will of course be understood that the invention is not limited to the form of construction described and shown, but includes all alternative forms in its scope. For example, and again without any implied limitation, the value taken by the angle 19—18—14 when the abutment 21 is operative, can be chosen to be greater or less than 90°, provided that the angle A is sufficiently small and that the polygon 20—17—16 is convex; the angle made by the arm 16 with the line C has been chosen in the vicinity of 90° in order that the curves $OD_1$ and TD may be substantially linear, and this choice brings out with particular clearness the gearing-down effect due to the crank-arm 17 in accordance with the invention, but this angle may have any other appropriate value; the effect due to the crank-arm 17 may further be combined wholly or in part in the control system with other variable gearing-down devices, whether continuous or discontinuous; it will also be understood that two or more crank-arms 17 may be provided in series, with abutments between them similar to the abutment 21 and that the cable 12 may be replaced by any other equivalent means such as a rod system, etc.

What we claim is:

1. An accelerator linkage for controlling the throttle valve of a motor vehicle from a manually operable pedal comprising a frame means, a reciprocating actuating long cable means, a guide means on said frame means for guiding said cable means, an actuated lever having a first pivot means on said frame means for rotation thereon, a head member on said cable at an end thereof opposed to said guide means, a link between said head member and said lever, a second pivot means connecting said head member with said link, a third pivot means connecting said link and said lever, the distance of the cable means between said guide means and said head member being greater than the lever to a such extent that the longitudinal axis of said cable means does not substantially move during operation of said linkage, an abutment means between said link and said lever defining a very small angle between said link and said axis when at rest; said link being inclined from said axis towards said first pivot means by said very small angle when at rest, whereby upon reciprocation of said cable means said lever and said link rotate initially as a whole around said first pivot means, said abutment being operative and said very small angle decreasing, while thereafter said link becomes aligned with said axis, said abutment being disengaged and said lever rotating alone around said first pivot means.

2. An accelerator linkage as defined in claim 1 wherein said very small angle is about 10°.

References Cited in the file of this patent

UNITED STATES PATENTS

| 228,917 | Miller | June 15, 1880 |
|---|---|---|
| 790,174 | Bollee | May 16, 1905 |
| 1,702,447 | McBrayer | Feb. 19, 1929 |
| 2,287,704 | Oberg | June 23, 1942 |
| 2,869,393 | Hutchinson | Jan. 20, 1959 |

FOREIGN PATENTS

| 249,499 | Great Britain | Apr. 7, 1927 |
|---|---|---|
| 718,057 | Great Britain | of 1954 |